Aug. 4, 1959     L. ROCKSTROM ET AL     2,897,893
SCORE-CUT SLITTING MECHANISM Filed Jan. 28, 1954     12 Sheets-Sheet 1

FIG. 1.

INVENTORS
Leonard Rockstrom and
Leon A. Schmidt
BY Thomas W. J. Clark
ATTORNEY

Aug. 4, 1959 L. ROCKSTROM ET AL 2,897,893
SCORE-CUT SLITTING MECHANISM

Filed Jan. 28, 1954 12 Sheets-Sheet 5

FIG.6.

INVENTORS
Leonard Rockstrom
and Leon A. Schmidt
BY
ATTORNEY

Aug. 4, 1959    L. ROCKSTROM ET AL    2,897,893
SCORE-CUT SLITTING MECHANISM

Filed Jan. 28, 1954    12 Sheets-Sheet 6

FIG. 7.

INVENTORS
Leonard Rockstrom
and Leon A. Schmidt
BY
ATTORNEY

Aug. 4, 1959

L. ROCKSTROM ET AL 2,897,893

SCORE-CUT SLITTING MECHANISM

Filed Jan. 28, 1954

INVENTORS
Leonard Rockstrom
and Leon A. Schmidt

BY

ATTORNEY

United States Patent Office 2,897,893
Patented Aug. 4, 1959

2,897,893

SCORE-CUT SLITTING MECHANISM

Leonard Rockstrom, Manhasset, and Leon A. Schmidt, Staten Island, N.Y., assignors to Cameron Machine Company, Brooklyn, N.Y., a corporation of New York Application January 28, 1954, Serial No. 406,646

10 Claims. (Cl. 164—60)

This invention relates to improvements in the slitting mechanism to score-cut a running web into a plurality of widths.

The invention is primarily directed to a slitting mechanism as a part of a rewind machine which receives a running web from a mill roll and slits it into a plurality of widths and then rewinds these widths on a single shaft. The improvements are directed primarily to the cutter bar and operation and standby mechanism for rocking that cutter bar so that the slitting wheels are immediately adjacent the cutter roll, or rocked away therefrom. The improvements in the cutter bar also include individual pinions on the wheel mounts to move them longitudinally of the bar on racks on the bar and also clamping means to clamp the individual wheel housings to the bar. Another object of the invention is to provide means to move the bar longitudinally of itself and to lock it in adjusted position so that when a long period of operation requires the same spacing of the wheels they may be moved longitudinally of the cutter roll to avoid undue wear at the locations of the wheel contact on that roll. The invention also contemplates the employment of both hydraulic pressure and pneumatic pressure to urge the slitting wheels against the web and cutter roll, the pressure immediately applied being hydraulic and that pressure being applied by means of air pressure. Because of variations in the thickness of the web which are at times very brief in length, the slitting wheels when only spring held or even pneumatically held tend to bounce and at times leave long sections uncut because of the slowness of springs and air pressure to respond to the release of the back pressure. In the instant invention hydraulic pressure allows for the slow retraction of the wheel from the cutter roll as well as firmly forcing the slitting wheel into impingement with that roll. If the swing of the wheel required is great, or sudden, the pneumatic pressure which yields rapidly is utilized to allow for the more rapid movement of the wheel either toward or from the cutter roll. To assure the most rapid return of the slitting wheel to operating position a valve is placed in the hydraulic piston which is displaced or bypassed to admit hydraulic pressure into the piston operating cylinder rapidly in volume, whereas the retraction of the wheel from the cutter roll is restricted by a small opening in the operating piston so that at all times the slitting wheel is held firmly by hydraulic pressure backed by flexible air pressure against the sleeve of the cutter roll to assure a firm cut, and a constant cut. Thus a minimum pressure can be placed on the slitting wheel and yet substantially cut the whole web and also cause minimum wear on both the slitting wheel and cutter roll.

A spring is used as a standby wheel adjusting means and in the preferred operation this spring is set to support the weight of the wheel and its mounting so that the hydraulic-air pressure mechanism may be utilized solely to place the proper pressure against the slitting wheel to cut the running web. In addition a divider is utilized to spread the web after cutting it to assure complete severance. Also trim guides are provided at the sides of the web riding against the cutter roll sleeve to remove the trimmed edges of the web.

Other objects and advantages of the invention will be apparent from the following description and the accompanying drawing forming a part hereof and in which.

In the drawings similar numerals refer to similar parts throughout the several views.

The invention is shown in connection with the rewind machine which is illustrated in Patent Number 2,743,879 dated May 1, 1956, Rewind Machine Riding Roller, to which reference may be made for a detailed description of parts of the machine illustrated herein which are not essential to an understanding of the present invention. Reference may also be had to the copending application filed shortly prior hereto by Felix Sacco and Leonard Rockstrom for, Flexible Web Tension Control Mechanism, Patent No. 2,804,275, dated August 27, 1957 for an explanation of other elements illustrated but not a part of the present invention.

A continuous web 1 of material is taken from a mill roll and passed over the compensating roll 2 in the rewind machine 3 and under the cutter roll or sleeve roll 4 against which it is slit before winding into the rewound roll 5. Slitting wheels 6 bear against the platen or hardened sleeve roll 4 herein generally referred to as the cutter roll, in any desired longitudinal position on that roll and they bear with sufficient pressure to sever the web into strips. The slitting wheels are softer than the sleeve roll 4 and although they are preferably not given a sharp edge, they divide the web.

The wheel 6 comprises cutting rim 7 attached to the flanges of the hubs 8 by screws 9. The hubs are mounted in bearings 10 secured in split bearing housings 11 which may be divided for the removal of the wheels and their bearings. The bearing housings 11 form part of the castings or mounts 12 which are pivoted at 13 to housings 14 which ride longitudinally on cutter bar 15. To maintain the housings 14 of each wheel on this bar it has a forward clamp 16 and a rear clamp 17 pivoted at 18 and having trunnion 19 therein through which passes screw 20 centrally of the housing and on which is fast bearing 21 held thereon by pin 22 in socket 23 in the front of the housing, the bearing being held in the housing by expanding split ring 24, this bearing thereby preventing longitudinal movement of the screw 20 so that upon its rotation by head 25 it moves the clamp 17 into locking position with the sloping under side of cutter bar 15 to hold the wheel housing in its longitudinally adjusted position on this cutter bar.

The cutter bar 15 has thereon racks 26 which are engaged by pinions 27 on shaft 28 to which they are affixed by pins 29 which shaft passes through bearing 30 in the housing 15. Rotation of shaft 28 thereby moves the housing and its slitting wheel longitudinally of cutter bar 15 and the housing is locked to this cutter bar by the clamp 17 operated by screw 20.

Figure 5:
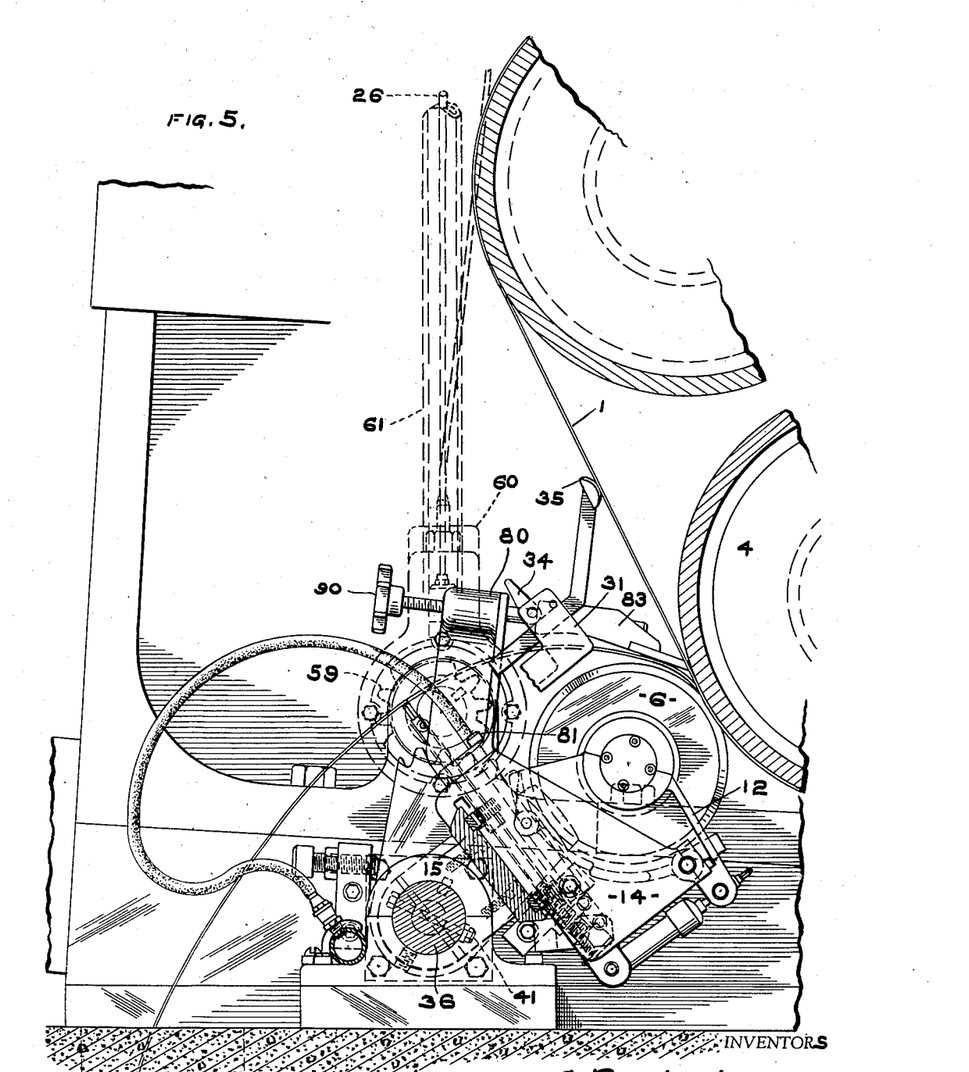
Figure 5 is a transverse sectional view of the machine showing the right side of one of the slitting wheels and its mounting.
Figure 6:
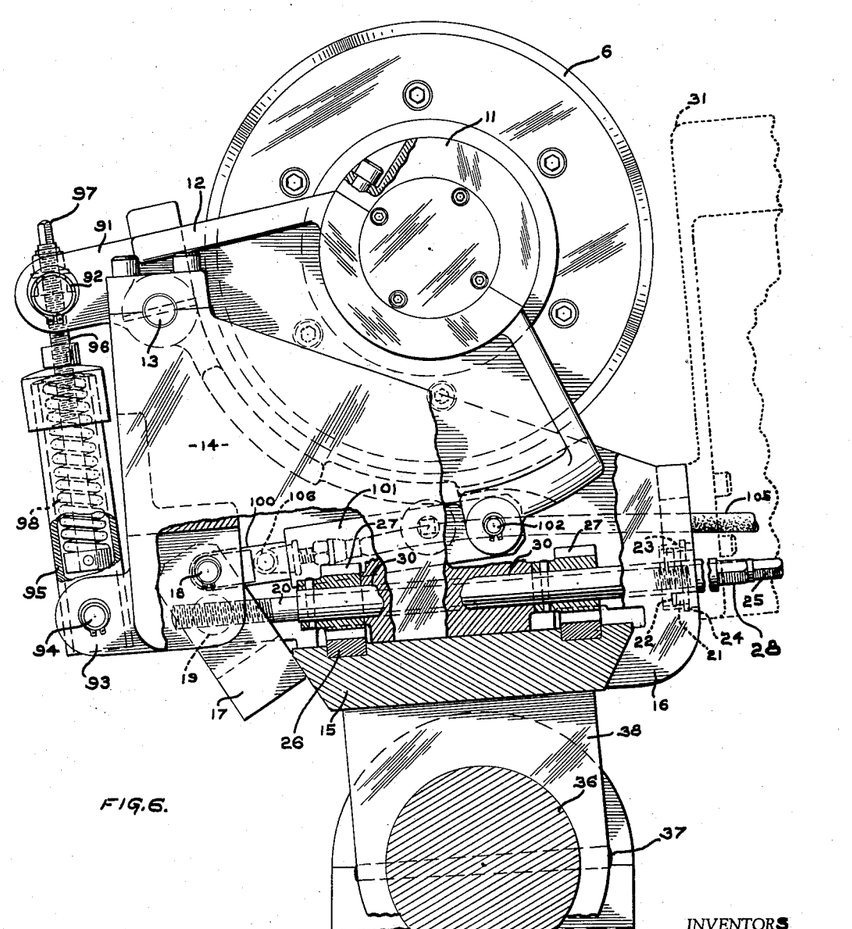
Figure 6 is a sectional view from the reverse side of a slitting wheel.
Figure 7:
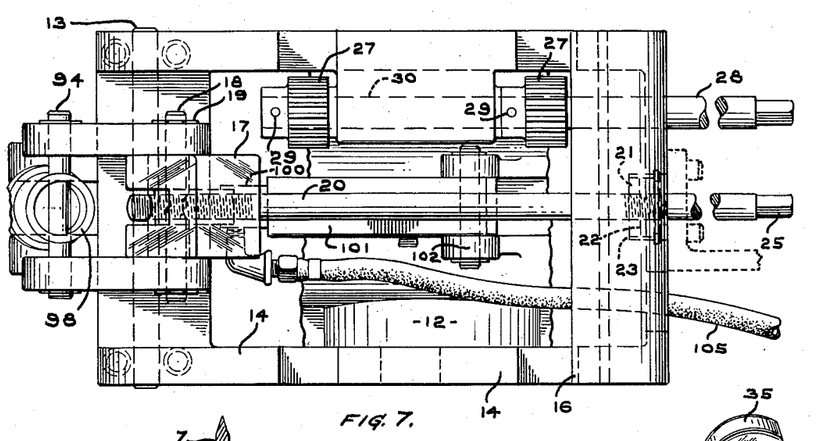
Figure 7 is an inverted plan view of the slitting wheel housing.
Figure 8:
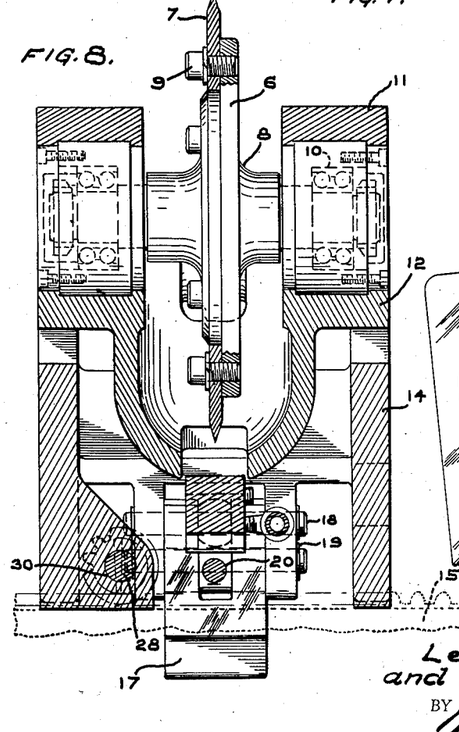
Figure 8 is a vertical sectional view from the front of the slitting wheel and its mounting.
Figure 11:
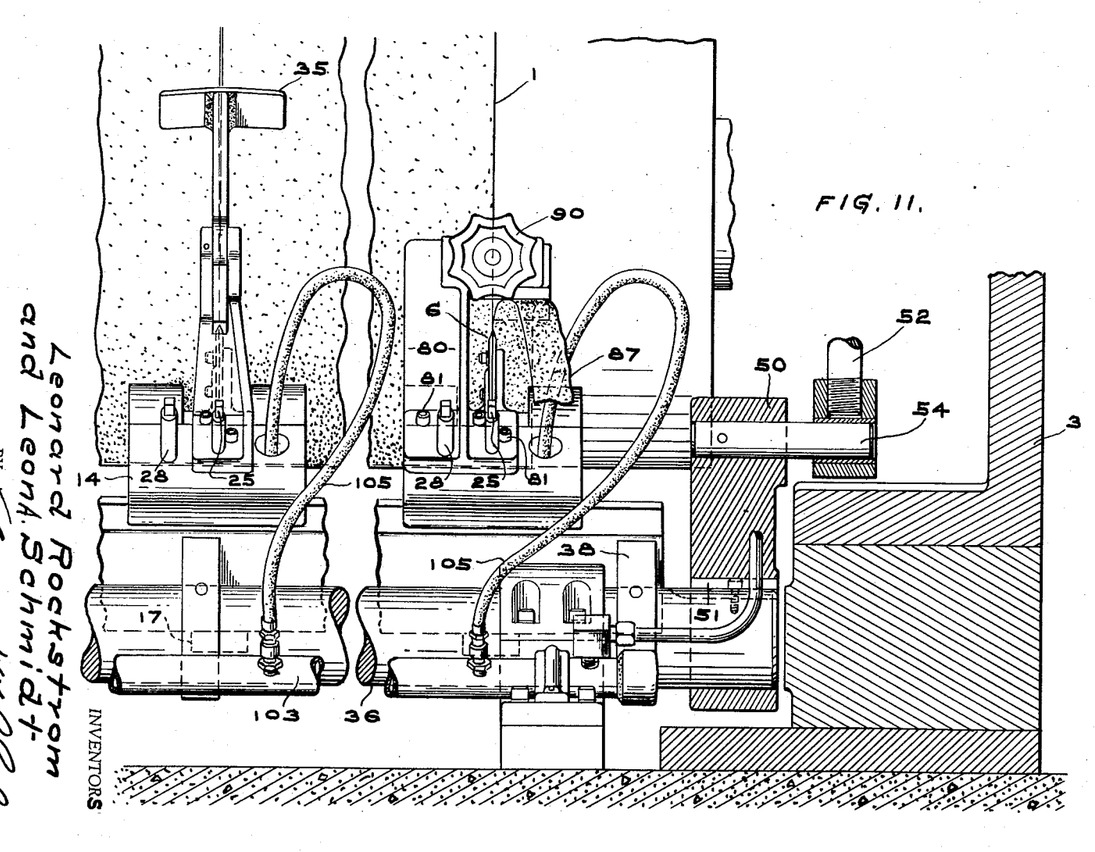
Figure 11 is a view similar to Figure 10 on the right side of the machine.
Figure 12:
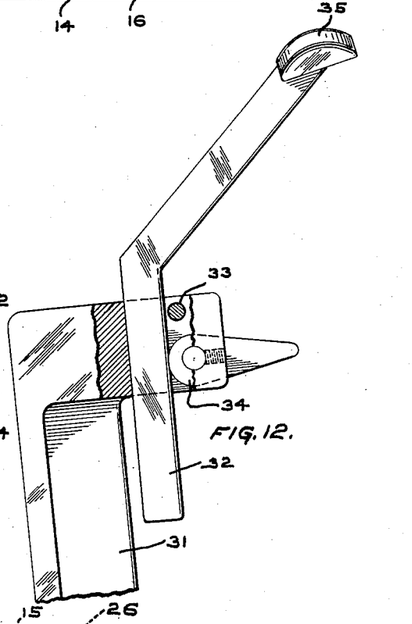
Figure 12 is a side elevational view partly in section of the spreader.

The housing has bracket 31 screwed to its face by screws 31' and the bracket has therein the shank 32 held by pin 33 and held fast in adjusted position by cam 34. The shank 32 has at its end the angular faced spreader 35 having a vertical forwardly extending center with backswept sides, which bears against the web 1 immediately after its cutting by the wheels 6 the forward center bearing on the line of cut, to push the sections of the web apart and to assure their complete separation along the cutting line, as best shown in Figures 5 and 11.

The cutter bar 15 is rigidly attached to shaft 36 by pins 37 passing through uprights 38 mounting the bar. Shaft 36 rotates in bearings 39 on supports 40. At the left end shaft 36 has fixed therein by bolt 41 reduced shaft 42 threaded at its outer end. This reduced shaft passes through the side of the winding machine 3 which has a ring 43 held by screws 44 fixed over the socket 45 through which the shaft 42 passes. Nut 46 screws over the threads of shaft 42 and it has back of ring 43 a ring 47 fixed to the nut by screws 48 to form a U-shaped edge surrounding ring 43 to prevent longitudinal movement of nut 46. Turning the nut 46 therefore moves shaft 36 longitudinally in its bearing and lock nut 49 maintains its longitudinal adjustment.

On the right end of shaft 36 is a lever arm 50 in which the shaft 36 may slide but which is held against relative rotation therewith by key 51. By means of pin 54 lever 50 is attached to piston 52 operating in cylinder 53. By means of cylinder 53 shaft 36 may be rocked to bring the slitting wheels into operating position with the sleeve roll or to rock them outwardly therefrom for threading or other purposes.

On the left hand end of shaft 36 is a segment gear 55 keyed to the shaft by key 56. This segment gear is engaged by pinion 57 on stub shaft 58 having on its outer end pinion 59. The outer end of stub shaft 58 and pinion 59 rotate in rotatable bearing 60 at the side of the machine 3. Projecting from bearing 60 is operating handle 61 containing rod 62 on the lower end of which is latch 63 to engage the pinion 59 when the latch edge is placed between the teeth of the pinion. Rod 62 has at its top handle 64 with projecting blades 65 which in one position fit in shallow grooves 66 to hold the latch out of engagement with the pinion and in a position at right angles thereto fit in grooves 67 deeper than grooves 66 to engage the latch with the pinion and thereby rotate the bearing 60 and stub shaft 58. The top 68 screwed in handle 61 contains the grooves 66 and 67 and has pressing against its underside spring 69 engaging rod 62 by nut 70 to thereby always urge the latch and handle top 64 downwardly.

Figures 9, 13, 14:
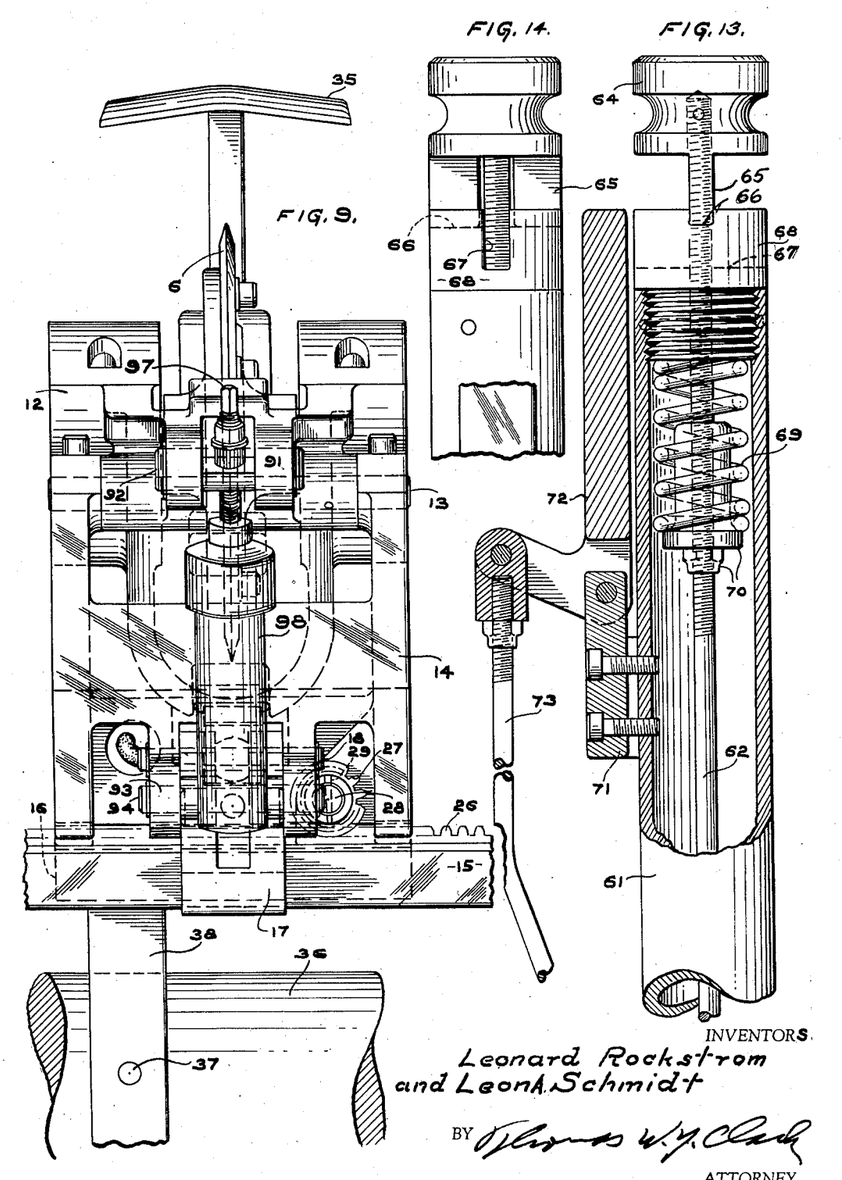
Figure 9 is an elevational view of the slitting wheel and its mounting from the rear.
Figure 13 is a vertical sectional view through the cutter bar rocking handle.
Figure 14 is a fragmentary elevational view of the top of this rocking handle at right angles to Figure 13.

Handle 61 has thereon bracket 71 mounting handle 72 to which is pivoted rod 73 to the lower end of which is attached locking plug 74 which fits in cylinder 75 rigidly attached to the side of the machine 3 by screw 76. This socket member 75 is enclosed by bearing 60 in its opening 77. It will be apparent that when the plug 74 is within the cylinder 75 that the handle 61 may not rock the stub shaft 58. In the ordinary operation of the cutter bar with hydraulic pressure from the other end of shaft 36 the latch 63 is out of engagement with the pinion 59 and the plug 74 is in its locking cylinder 75. Plug 74 is normally held in socket 75 by the spring at the top of the plug, bearing on the plug housing to hold the plug down. The plug may be raised to swing handle 61 by squeezing handle 72 against handle 61. The plug is shown raised in Figure 10 and with the handle 72 in position to hold the plug up in Figure 13.

Figure 10:
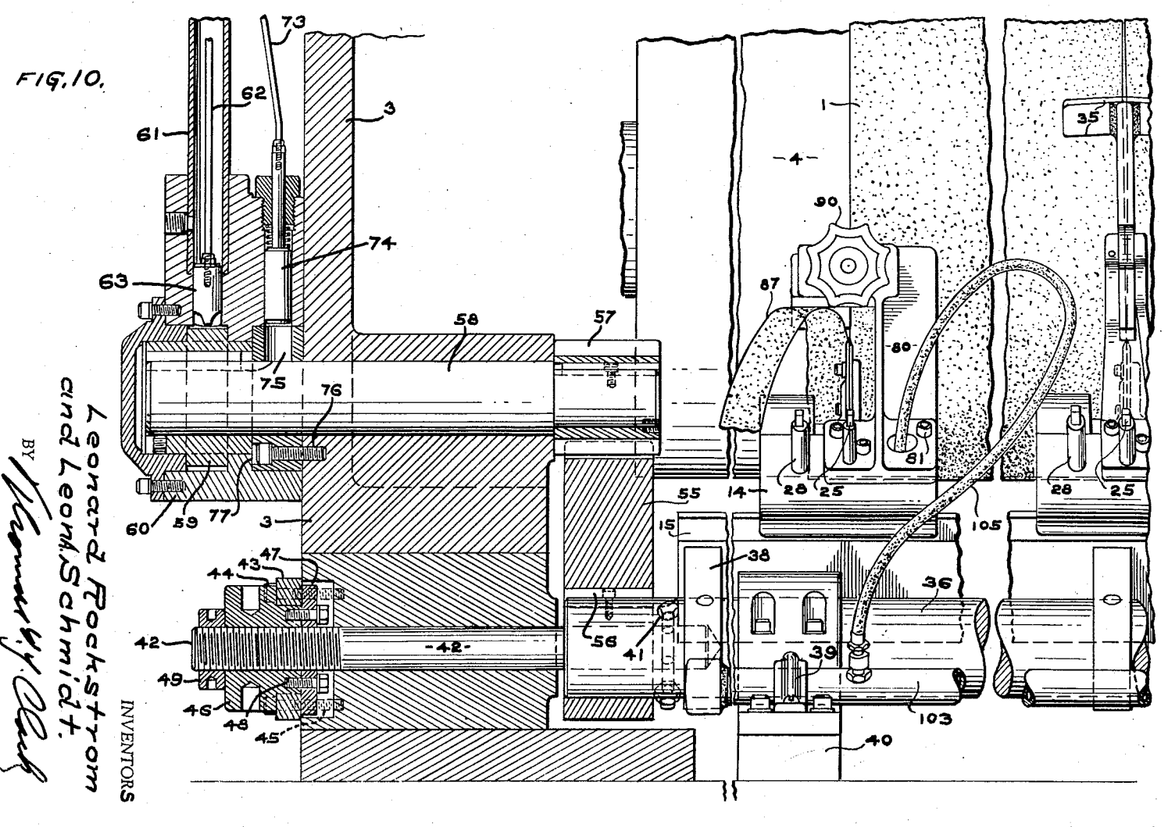
Figure 10 is a front elevational view of the slitter with part of its adjusting means shown in section.
Figure 15:
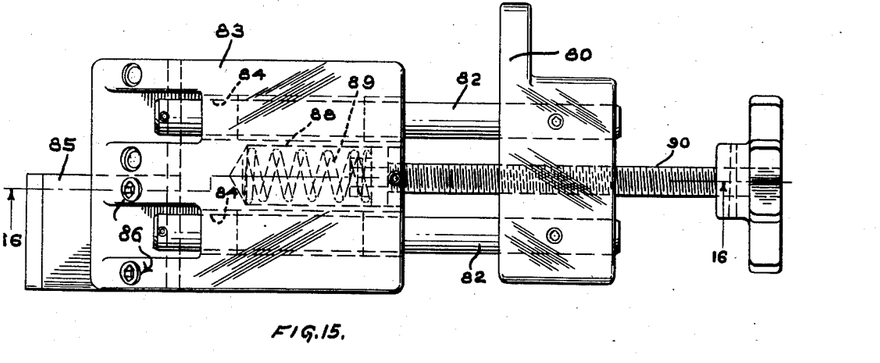
Figure 15 is a top plan view of the machine left hand trim guide.
Figure 16:
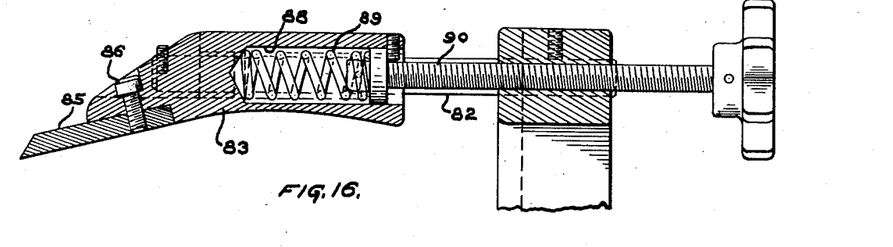
Figure 16 is a sectional view thereof on line 16—16 of Figure 15.

At each end of shaft 36 the slitting wheel housings 14 have trim guide supports 80 fast thereto by screws 81 connecting their lower ends to housings 14, these taking the place of the spreader brackets 31 at the two sides of the machine. These supports 80 are rectangular center ribbed castings extending vertically as shown in Figures 5, 10 and 11 and have at their tops rods 82 fixed in enlargements of the castings and the rods 82 extend at right angles from the back of the support castings 80 toward the sleeve roll. The vertical central portion of the casting support toward the web edge next to the center rib is omitted to leave operating room for the slitting wheel and the passage of the web edge. The rods 82 slide in and support trim guides 83 having openings 84 therein for the rods, as shown in Figures 15 and 16. The guides 83 have blades 85 fixed thereto by screws 86 under which blades the edges 87 of the web 1 run. The guides 83 have sockets 88 therein for springs 89 pushed by screws 90, by which their forward position may be adjusted. In the preferred practice they are adjusted forward so that the blades 85 always bear lightly on the sleeve roll 4 with the blades extending over the extreme edge of the web, and the edge of the blade toward the web center is in vertical alignment with the slitting wheel on whose housing the blade support guide is mounted.

Wheel mounting 12 has an extension 91 with a trunnion 92 therethrough and housing 14 has a corresponding extension 93 with a rod 94 therethrough. Cylinder 95 pivots on rod 94 and its spring held piston 96, threaded at its upper end, is held longitudinally adjustable in trunnion 92 by the screw threads therein and the piston may be turned for adjustment at its top end 97. The piston is held down in the cylinder by spring 98 fixed to the bottom end of the piston and bearing against the top of the cylinder 95. This spring actuated cylinder is normally used to lift the weight of the mount 12 with its slitter wheel to effect contact with the cutter roll and the hydraulic-pneumatic air pressure cylinder and piston hereinafter described are used to maintain the desired pressure on the slitter wheels. The fact that the wheels are against the web when the pneumatic-hydraulic pressure is admitted avoids a sharp impact of wheel with roll. If by chance this pressure should fail the spring 98 can be tightened to maintain the needed pressure on the slitter wheel.

The housing 14 has pivoted at 18 piston 100. This piston operates in cylinder 101 pivoted at 102 to the mount 12 so that relative movement of the piston and cylinder raises mount 12 about its pivot 13 in housing 14 and tilts the slitting wheel 6 tightly against the sleeve roll 4. The amount of pressure exerted against the piston determines the pressure of the slitting wheel against the roll.

Figure 17:
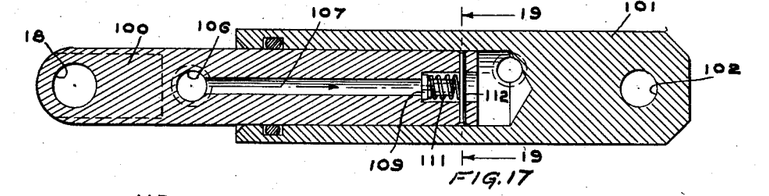
Figure 17 is a longitudinal sectional view of the hydraulic cylinder and piston for maintaining pressure of the slitting wheel on the cutter roll.
Figures 18, 20:
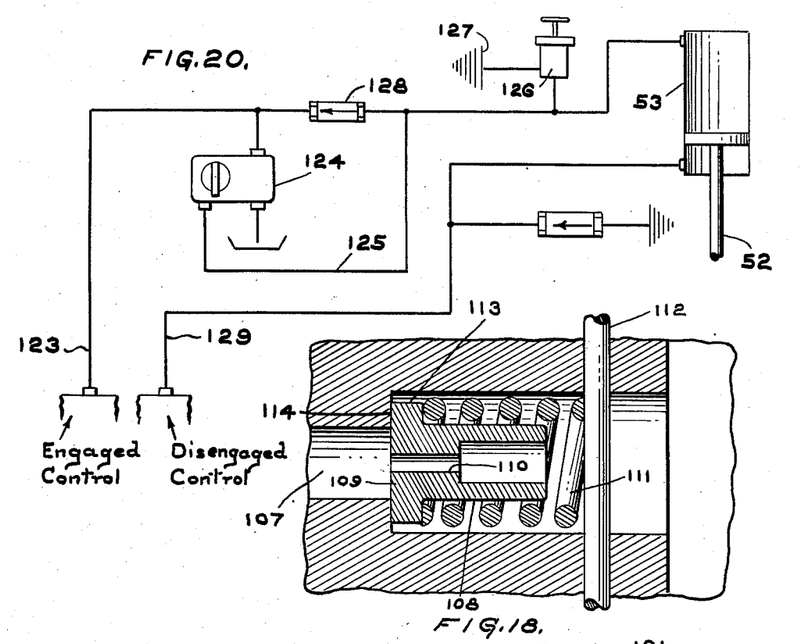
Figure 18 is a sectional fragmentary enlargement of the operating end of the piston.
Figure 20 is a diagrammatic view of the hydraulic system for rocking the cutter bar.
Figure 19:
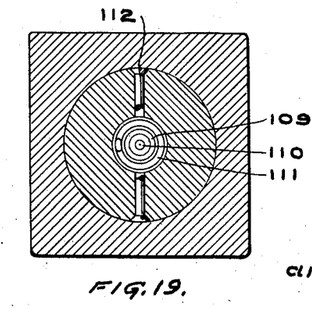
Figure 19 is a sectional view of the piston in the cylinder on line 19—19 of Figure 17.

Hydraulic pressure is admitted to the cylinders through manifold 103 extending across the front of the machine parallel to shaft 36. The manifold has a plurality of openings 104 thereon to any of which separate hose 105 may be connected. Each hose leads to orifice 106 in each piston 100 through which oil passes through opening 107 in the piston to the check valve generally referred to as 108. This check valve has therein restrictor 109 which has a small opening 110 always open therethrough. The restrictor is held by spring 111 resting on pin 112 passing through the end of the piston at one end and on the shoulder 113 of the restrictor at the other end to hold it against the shoulder 114 in the piston. By means of this construction oil in small quantity may always pass either way through opening 110 in the restrictor valve. Should the slitting wheel hit a high spot in the web it will tend to retract and oil will pass slowly through this passage 110, passing to the left as shown in Figures 17 and 18. But when the high spot is passed the spring 111 will be compressed and oil will flow fast to the right in Figures 17 and 18, around the shoulder 113 of the restrictor to insure immediate pressure against the slitter wheel when the high spot is passed and the restrictor passage 110 will permit the passage of oil always to maintain pressure on the slitter wheel and to insure against bouncing of the wheel on the sleeve roll.

Filtered air is admitted to the machine through line 115 and for this invention the air passes from line 115 to line 116 through control valve 117 to the top of booster cylinder 118. Oil passes from reservoir 119 through one way check valve 120 to the bottom of the booster cylinder 121. Line 122 through which the oil passes is connected to the various slitting wheel pistons 100 by means of the manifold above described. The regulation of valve 117 admitting the filtered air under pressure to the booster cylinder 118 thereby determines the hydraulic pressure and in turn the pressure of the slitter wheels against the sleeve roll.

Figure 1:
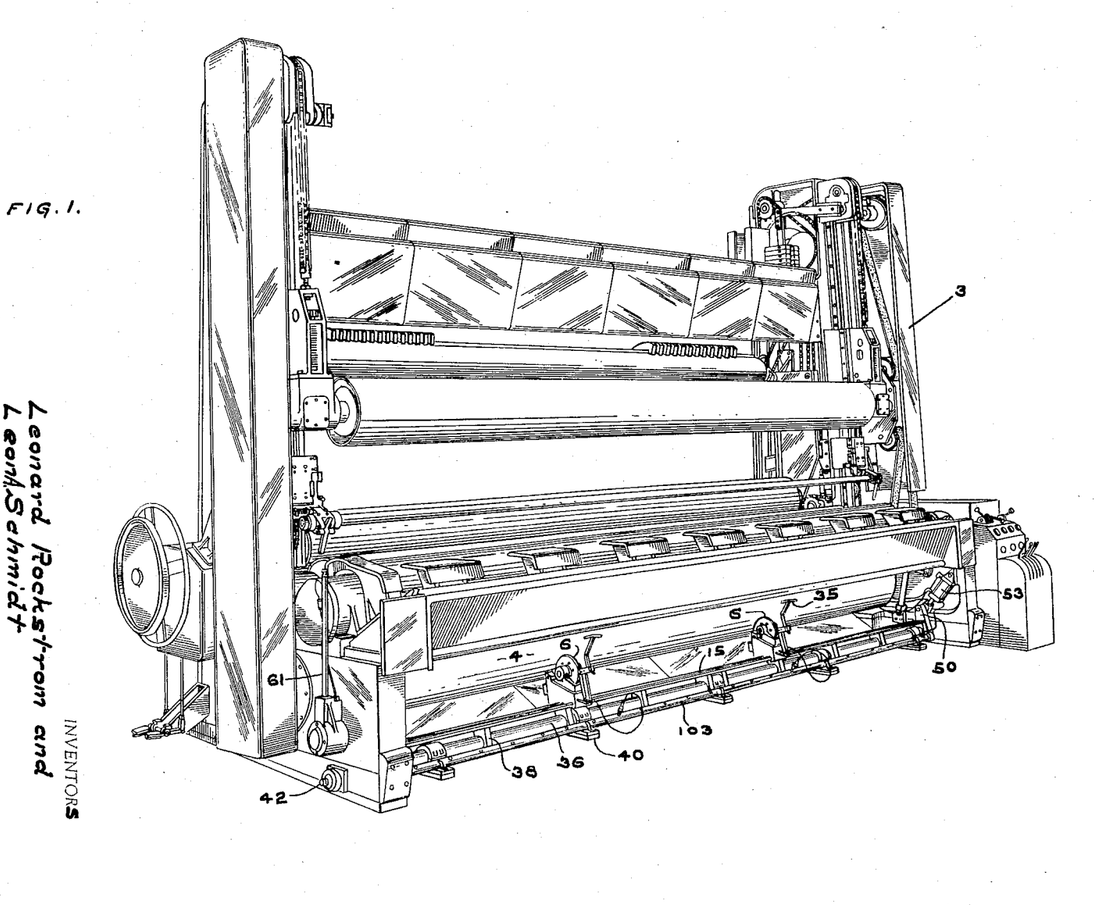
Figure 1 is a front perspective view of the rewind machine showing the slitters of this invention.
Figures 2, 3:
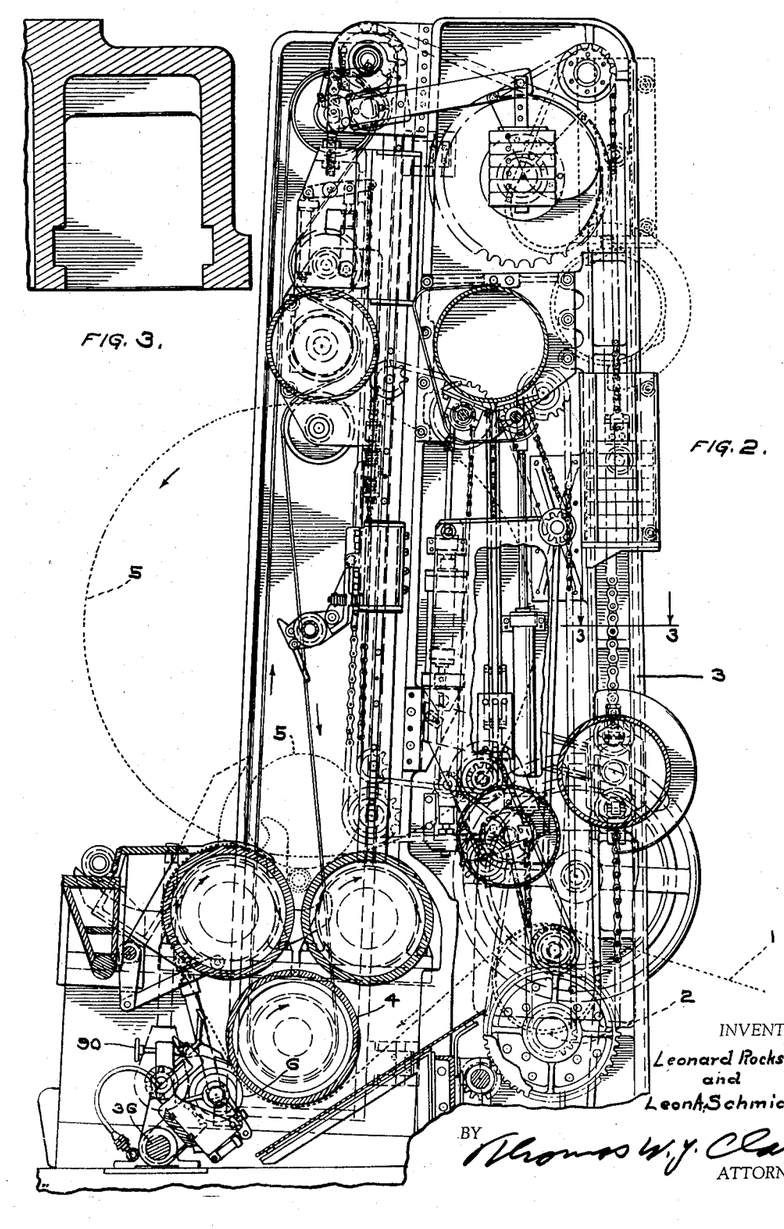
Figure 2 is a transverse cross-sectional view thereof.
Figure 3 is a sectional view on line 3—3 of Figure 2.
Figure 4:
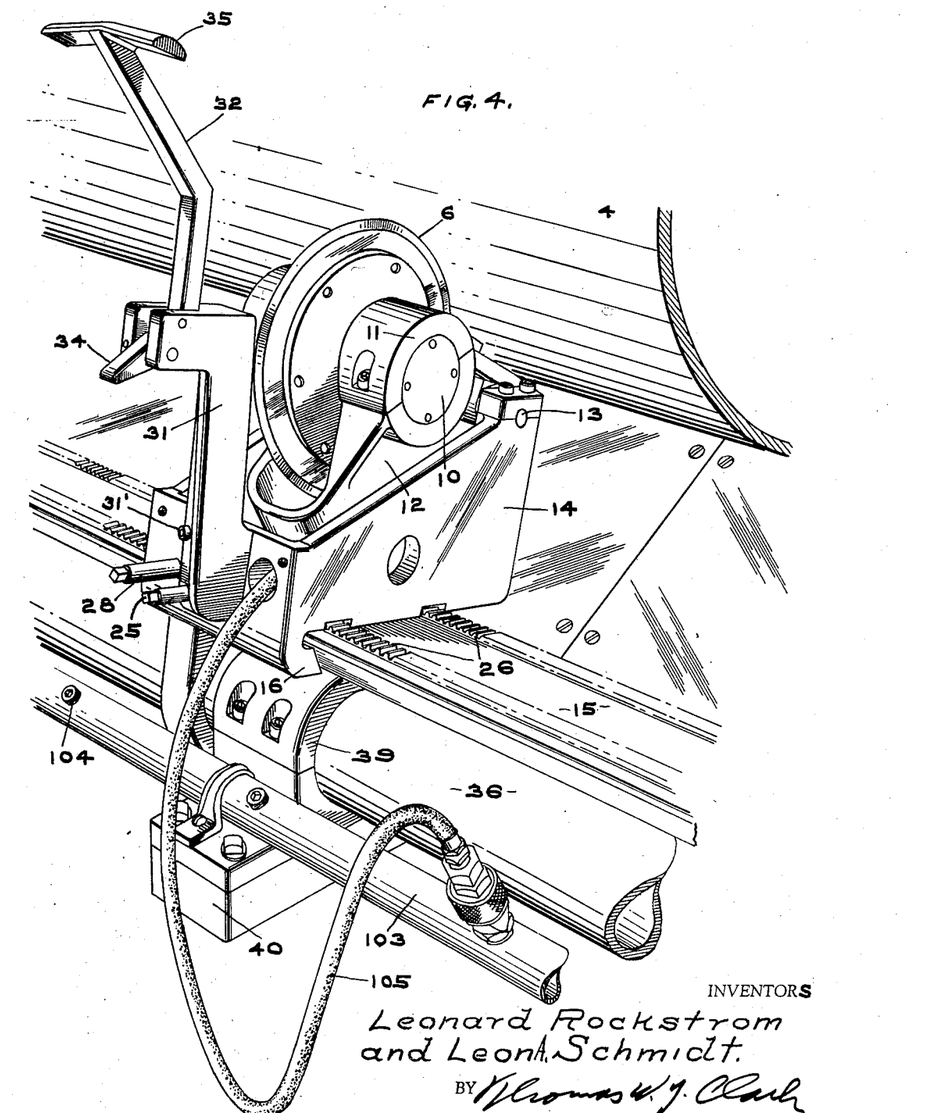
Figure 4 is a perspective view of the right side of one of the slitting wheels and its mounting means.
Figure 21:
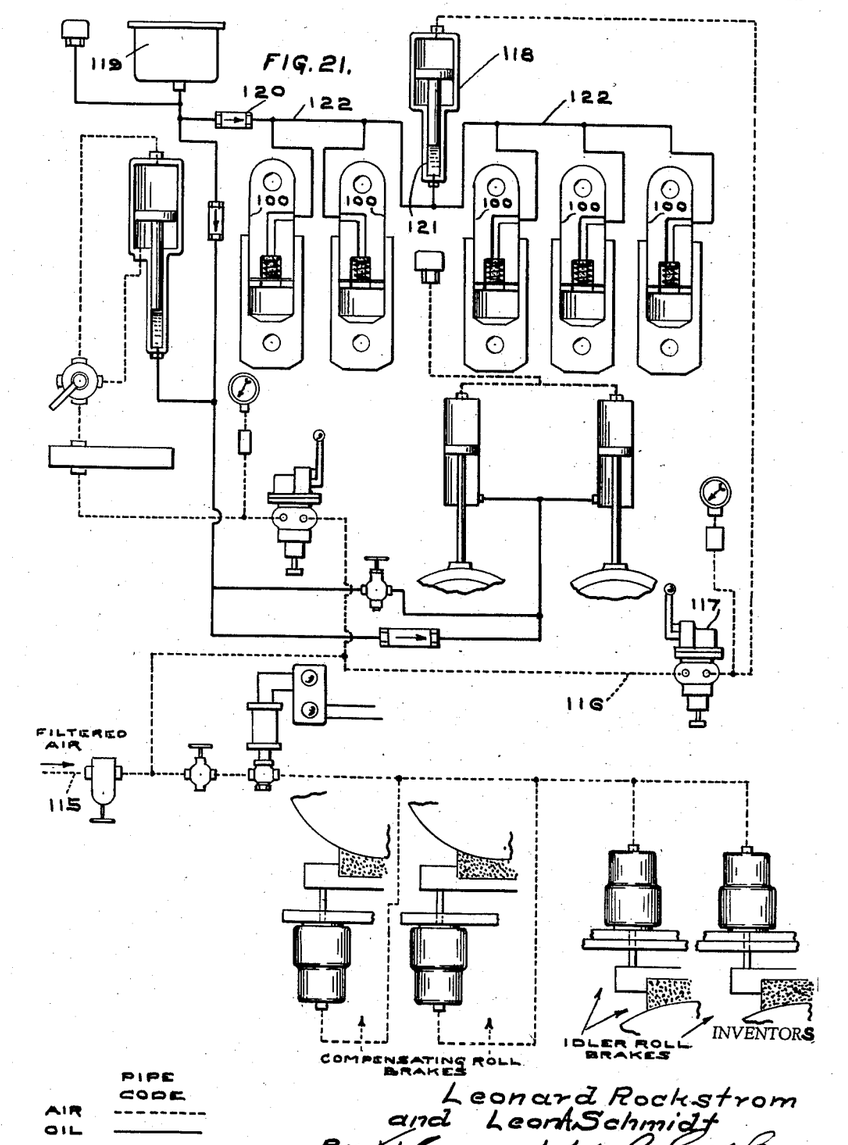
Figure 21 is a diagrammatic view of the hydraulic-pneumatic systems for placing the slitting wheels under cutting pressure.

The line 122 shown diagrammatically in Figure 21 is the manifold 103 of Figures 4 and 10. The piston in the booster cylinder is free floating, being subject at its top end, which is relatively large, to the air pressure from line 116 and at its lower end, which is relatively small as shown exerting fluid pressure in diagrammatically illustrated line 122 and upon the fluid in manifold 103.

As shown in Figure 20 when hydraulic pressure is introduced to line 123 it passes through flow control valve 124, line 125 to the top of cylinder 53 to rock the cutter bar so that the slitter wheels substantially engage the sleeve roll. This line 125 has therein relief valve 126 draining to the tank at 127. It also has therein one way valve 128 by means of which valve 124 is bypassed. When pressure is admitted to line 129 the fluid passes to the bottom of the cylinder 53 to rock the cutter bars forward away from the sleeve roll 4. A common panel for operating the various elements of the machine including the slitter rack bar of the instant application is illustrated in the second of the above noted patents.

The operation of the cutter bar and its adjustments for supporting the slitting wheels as well as the operation of the hydraulic and pneumatic pressure to give the desired pressure on the slitting wheels will be apparent from the above description. It will also be apparent that many modifications can be made in the details of the construction without departing from the invention.

What is claimed as new and is desired to be secured by Letters Patent is:

1. In a score-cut slitting mechanism for slitting a running web having a cutter roll, a parallel rocking cutter bar and a plurality of slitting wheels including mountings therefor mounted individually on the cutter bar, the combination of constantly operating individual resilient means on each wheel mounting to urge the wheels into operative relation with the cutter roll, separate means to rock the cutter bar to move the wheels as a group into operating relation with the cutter roll and individual fluid pressure means independent of said resilient and rocking means to precisely vary the pressure between each wheel and the roll.

2. In a score-cut slitting mechanism for slitting a running web having a cutter roll, a parallel cutter bar and a plurality of slitting wheels mounted individually and adjustable longitudinally on the cutter bar, in combination for each wheel, a housing longitudinally adjustably mounted on the cutter bar, a wheel mount pivoted in said housing, resilient means between the mount and housing to maintain the wheel against the roll, combined pneumatic-hydraulic means independent of the resilient means to swing the mount relative to the housing to precisely regulate the pressure of the impingement of the wheel on the cutter roll and valve means remote from said slitting mechanism for controlling said hydraulic means.

3. In a score-cut slitting mechanism for slitting a running web having a cutter roll, a parallel cutter bar and a plurality of slitting wheels mounted individually and adjustable longitudinally on the cutter bar, in combination for each wheel, a housing mounted on the cutter bar, a wheel mount pivoted in said housing, a fluid operated piston and cylinder connected to and between the housing and mount to swing the mount relative to the housing to impinge the wheel on the cutter roll upon relative movement between the piston and cylinder, partially open movable valve means in the fluid line to said cylinder resilient means to hold said valve means partially closed, the valve means being moved against the resilient means by the flow of fluid to admit fluid to the cylinder rapidly and closed by the resilient means to pass it therefrom slowly and valve means remote from said slitting mechanism for controlling the flow of fluid to and from said piston and cylinder.

4. In a score-cut slitting mechanism for slitting a running web having a cutter roll, a parallel cutter bar and a plurality of slitting wheels mounted individually and adjustable longitudinally on the cutter bar, in combination for each wheel, a housing mounted on the cutter bar, a wheel mount pivoted in said housing, a fluid operated piston and cylinder connected to and between the housing and mount to swing the mount relative to the housing to impinge the wheel on the cutter roll upon relative movement between the piston and cylinder, partially open movable valve means in the fluid line to said cylinder having therein a constantly open passage to admit fluid therethrough slowly and resilient means to hold said valve means partially closed, the valve means being moved against the resilient means by the flow of fluid to admit fluid to the cylinder rapidly by unseating said valve means and bypassing said passage.

5. In a score-cut slitting mechanism for slitting a running web having a cutter roll, a parallel cutter bar and a plurality of slitting wheels mounted individually and adjustable longitudinally on the cutter bar, in combination for each wheel, a housing longitudinally adjustably mounted on the cutter bar, a wheel mount pivoted in said housing, hydraulic means comprising a piston and cylinder connected to and between the housing and mount to swing the mount relative to the housing upon relative movement between the piston and cylinder to impinge the wheel on the cutter roll and valve means in the fluid line to said cylinder having therein a regulated open passage to admit fluid therethrough to impinge the wheel on the cutter roll, and to restrict the flow of fluid therethrough reversely upon the cutter wheel striking an obstruction on the cutter roll, the admitting passage being variably larger than the reverse passage.

6. In a score-cut slitting mechanism for slitting a running web having a cutter roll, a parallel cutter bar and a plurality of slitting wheels mounted individually and adjustable longitudinally on the cutter bar, in combination for each wheel a housing longitudinally adjustably mounted on the cutter bar, a wheel mount pivoted in said housing a fluid actuator comprising a piston and cylinder connected to and between the mount and housing to swing the mount relative to the housing to impinge the wheel on the cutter roll upon relative movement between the piston and cylinder, partially open movable valve means in the actuator moved to a larger opening by the flow of fluid to admit fluid rapidly into the cylinder, resilient means to hold said valve means partially closed to pass fluid from the cylinder slowly and valve means remote from said slitting mechanism for controlling the pressure in said cylinder.

7. In a slitting mechanism for slitting a running web having a web rotatable backing means adapted to extend across one side of a web to be slit, a cutter bar parallel to the backing means adapted to extend on the other side of the web to be slit, a rack on the cutter bar and a plurality of slitting wheels, the combination therewith for each wheel, a housing longitudinally movable along the cutter bar, a wheel mount pivoted in the housing and a fluid pressure actuator connected to and between the housing and mount to swing the mount relative to the housing toward the web backing means to position the wheel to web slitting position, spring means separate from the fluid pressure means between the mount and housing to swing the wheel toward the web backing means to position the wheel to web slitting position, a pinion in each housing engaging the rack to move the housing along the bar upon rotation of the pinion, means projecting away from the backing means from one side of the housing to rotate the pinion, a cutter bar clamp in each housing and means projecting from said side of the housing to adjust the clamp to hold the housing from movement by the pinion rotation, means connected to the bar and limited to movement normal thereto to rock the bar to and from web slitting position for all the wheels together, means to move the cutter bar longitudinally of said web backing means and means to lock the cutter bar in longitudinal position to thereby vary simultaneously the location of slitting of all the wheels on the cutter bar.

8. In a slitting mechanism for slitting a running web having a rotatable web backing means adapted to extend across one side of a web to be slit, a cutter bar parallel to the backing means adapted to extend on the other side of the web to be slit, a rack on the cutter bar and a plurality of slitting wheels, the combination therewith for each wheel, a housing longitudinally movable along the cutter bar, a wheel mount pivoted in the housing and a fluid pressure actuator connected to and between the housing and mount to swing the mount relative to the housing toward the web backing means to position the wheel to web slitting position, the actuator extending across the cutter bar within the housing between the bar and the wheel and mount, spring means separate from the fluid pressure means between the mount and housing to swing the wheel toward the web backing means to position the wheel to web slitting position, a pinion in each housing engaging the rack to move the housing along the bar upon rotation of the pinion, means projecting from one side of the housing to rotate the pinion, a cutter bar clamp in each housing and means projecting from said side of the housing to adjust the clamp to hold the housing from movement by the pinion rotation.

9. In a slitting mechanism for slitting a running web having a rotatable web backing means adapted to extend across one side of a web to be slit, a cutter bar parallel to the backing means adapted to extend on the other side of the web to be slit, a rack on the cutter bar and a plurality of slitting wheels, the combination therewith for each wheel, a housing longitudinally movable along the cutter bar, a wheel mount pivoted in the housing and a fluid pressure actuator connected to and between the housing and mount to swing the mount relative to the housing to position the wheel to web slitting position, spring means separate from the fluid pressure means between the mount and housing to position the wheel to web slitting position, a pinion in each housing engaging the rack to move the housing along the bar upon rotation of the pinion, means projecting from the rear of the housing to rotate the pinion, a cutter bar clamp in each housing and means projecting from the rear of the housing to adjust the clamp to hold the housing from movement by the pinion rotation, a geared segment extending normal to the bar and keyed thereto to rock the bar to and from wheel web slitting position, a lever and means therein engageable with the segment to rock the same and means to lock the segment engagable means from segment engagement, means to move the cutter bar longitudinally and means to lock it in longitudinal position to thereby vary simultaneously the location of slitting of all the wheels on the cutter bar.

10. In a score-cut slitting mechanism for slitting a running web having a cutter roll, a cutter bar extending parallel to the cutter roll and a plurality of slitting wheels, the combination therewith for each wheel a housing longitudinally adjustably mounted on the cutter bar, a wheel mount pivoted in the housing and a fluid pressure actuator connected to and between the housing and mount to swing the mount relative to the housing to impinge the wheel on the cutter roll, means to move the cutter bar longitudinally and to lock it in longitudinal position to thereby vary simultaneously the location of impingement of all the wheels on the cutter roll and a side trimmer having a resiliently extended blade, the trimmer being adjustably mounted on the housing adjacent the web edge and the trimmer blade being adapted to bear resiliently upon the cutter roll and positioned with one end in line with the slitting wheel and extending outwardly therefrom toward the web edge, to guide the web edge from the cutter roll.

References Cited in the file of this patent

UNITED STATES PATENTS

| Number | Name | Date |
|---|---|---|
| 674,919 | Jeffris | May 28, 1901 |
| 883,793 | Engberg | Apr. 7, 1908 |
| 1,133,142 | Hirsch | Mar. 23, 1915 |
| 1,326,644 | Cameron et al. | Dec. 30, 1919 |
| 1,465,966 | Cameron et al. | Aug. 28, 1923 |
| 1,465,967 | Cameron et al. | Aug. 28, 1923 |
| 1,534,274 | Krump | Apr. 21, 1925 |
| 1,570,939 | Cameron et al. | Jan. 26, 1926 |
| 1,678,340 | Johnstone | July 24, 1928 |
| 1,719,664 | Ligon | July 2, 1929 |
| 1,809,327 | Badgley | June 9, 1931 |
| 1,944,781 | Cameron | Jan. 23, 1934 |
| 1,975,138 | Demarest | Oct. 2, 1934 |
| 2,541,913 | Carter | Feb. 13, 1951 |
| 2,621,543 | Rossmann | Dec. 16, 1952 |
| 2,681,818 | Rosan | June 22, 1954 |
| 2,796,933 | Gelleke | June 25, 1957 |

FOREIGN PATENTS

| 400,511 | Great Britain | Oct. 26, 1933 |